March 24, 1959 A. A. KUCHER 2,879,341

TAPE RECORDER AND PLAYER

Filed May 6, 1954

A. A. KUCHER
INVENTOR.

BY E. C. McRae
J. R. Faulkner
G. H. Oster

ATTORNEYS

United States Patent Office 2,879,341

Patented Mar. 24, 1959

2,879,341

TAPE RECORDER AND PLAYER

Andrew A. Kucher, Dearborn, Mich., assignor to Ford Motor Company, Dearborn, Mich., a corporation of Delaware Application May 6, 1954, Serial No. 428,051

5 Claims. (Cl. 179—100.2)

This invention lies in the field of sound recording and reproducing and is more specifically concerned with a system and apparatus intended to render magnetic recording and reproduction completely adaptable to mobile uses.

There has long been needed an apparatus and system which would enable the operators of motor vehicles to use magnetic recording and reproducing apparatus but none to date has been adopted because of the complexity of the manipulation required to operate the conventional magnetic recording apparatus. The instant invention has been developed in an effort to dispense with these usual operating complexities inherent in magnetic tape or wire recording and reproduction and to make such a machine readily adaptable to transport use.

This invention is best explained by reference to the drawings, in which

Figure 1:
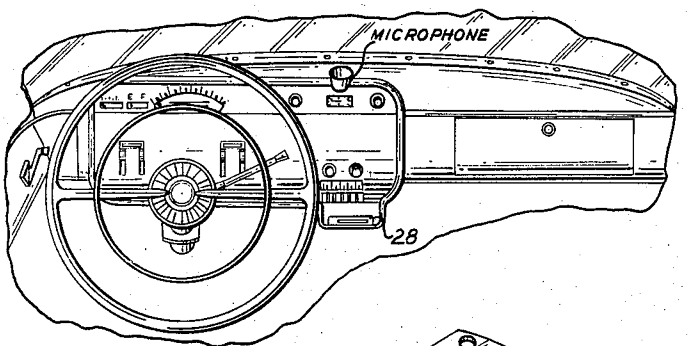
Figure 2:
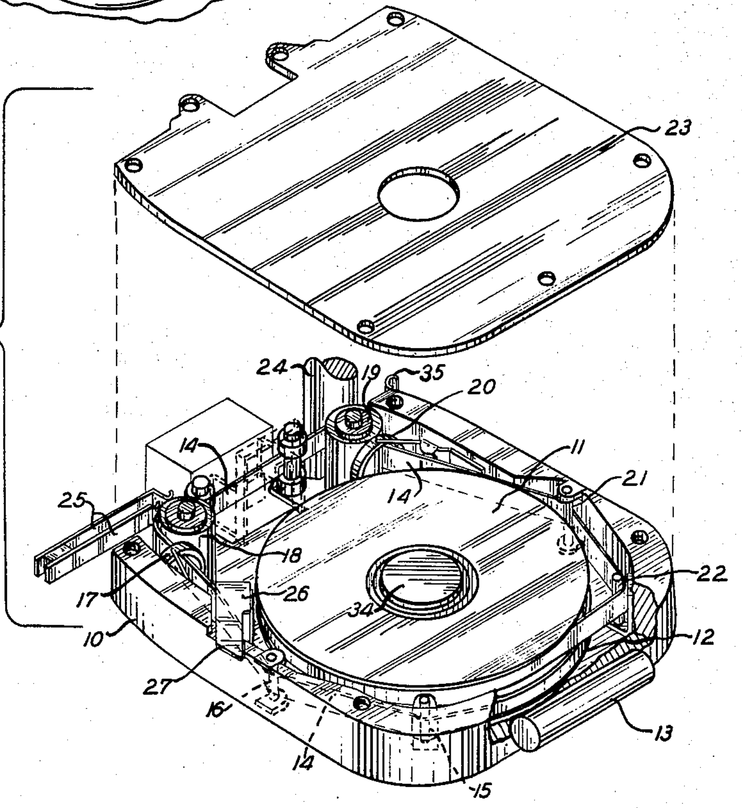
Figure 3:
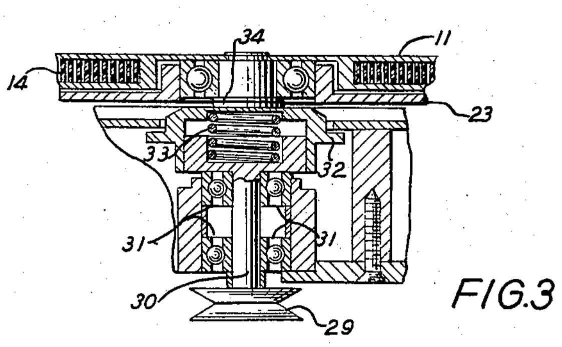

Figure 1 is a perspective view of a portion of an automotive dash board in which this invention has been installed, and Figure 2 is a perspective view of a tape cartridge adapted for mobile use, and Figure 3 is a cross section of a portion of the drive employed to move the magnetic tape past the reproduction and recording head.

The heart of the invention is encompassed in the portable tape cartridge which is shown in perspective in Figure 2. Figure 2 discloses this cartridge as a tray-like metallic case 10 in which are rotatably mounted an upper tape reel 11 and a lower tape reel 12. The rear of case 10 is provided with handle 13 for ease of manipulation. As shown in the drawing, the lower reel 12 before playing would normally contain almost all of the magnetic tape upon which intelligence has been recorded. The tape is indicated in the drawing as 14. Tape 14 is led from the lower reel 12 over guides 15, 16 and 17, around roller 18, around roller 19, past guides 20, 21 and 22 and onto upper reel 11. It is, of course, to be understood that upper reel 11 and lower reel 12 are capable of simultaneous and independent rotation. The entire structure is normally closed by the application of cover plate 23.

As will be explained later, the speed of the tape past the recording head is controlled by capstan 24 and the apparatus is shut off at the end of a reel by contacts 25. Operation of the device is initiated by contact of arm 35 with a part of the assembly associated with the fixed part of the apparatus. When not in use the reels are held stationary by brake 26 operated by member 27 projecting through and beyond case 10.

Reverting to Figure 1, the cartridge combining case 10 and its contents is designed to be fed into a receptacle 28 mounted preferably directly below the automobile radio.

Figure 3 is a cross sectional view of a portion of the apparatus used to propel the upper reel and take up the tape which has been unwound from the lower reel 12 and guided past the reproducing and recording head.

This drive comprises a pulley 29 adapted to be driven by a belt which is not shown. Pulley 29 is mounted upon shaft 30 which is journalled in bearings 31. At the end of shaft 30 remote from pulley 29, is mounted driver 32 which is supported by spring 33. Driver 32 is capable of an axial motion much with respect to shaft 30 but is incapable of any separate angular movement. Driver 32 is designed to contact driven disc 34 which in turn drives upper reel 11. Driven disc 34 is also noted in Figure 2.

From the above description, it can be seen that this apparatus operates as follows: The cartridge comprising case 10, the enclosed tape reels and the associated parts is normally carried in receptacle 28 which is located beneath the car radio. As the cartridge is thrust home in the receptacle 28, driven disc 34 becomes aligned with driver 32 and driver 32 exerts a slight spring tension thereupon. The insertion of the cartridge in the receptacle also causes member 27 to contact a stationary portion of the receptacle and release brake 26. Capstan 24 is forced resiliently into contact with roller 19 with the tape 14 between capstan 24 and roller 19 and driven thereby. The tape which is guided by rollers 18 and 19, driven by capstan 24 and taken up by upper reel 11 is guided past a magnetic pickup and reproducing head which is located so as to contact the tape being drawn between rollers 18 and 19.

The voltage generated by the magnetic pickup may be converted into sound in any desired fashion but is preferably applied to the grid of the first audio stage of the radio receiver.

As shown in Figure 1, a microphone may be provided and connected to the magnetic head for recording any desired intelligence upon the tape. The usual magnetic head is provided wih an erasing mechanism. In mobile use it is preferred to omit the erasing head to prevent the loss of valuable recordings through inadvertent erasure. To further reduce the manipulations contacts 25 are provided and the tape near the end of the reel is provided with a conductive coating which short circuits or grounds these contacts and stops the mechanism at the end of the reel. When the mechanism is so stopped, the other half of the tape may be played or recorded upon by simply manually withdrawing the cartridge from receptacle 28, inverting it and reinserting it.

I claim as my invention:

1. A mobile magnetic reproducing and recording device comprising a cartridge and a receptacle for said cartridge, said cartridge containing two superimposed and independently rotatable spools for the reception of a magnetic medium, means for guiding the magnetic medium from one spool past a reproducing and recording head and upon the second spool, driven means affixed to one of said spools, driving means positioned in said receptacle, said driving means comprising a rotatable shaft, a driver positioned over one end of said shaft, said driver being capable of axial motion with respect to said shaft but incapable of angular motion with respect thereto, a spring positioned between said shaft and said driver for positioning said driver axially on said shaft in frictional driving relationship with the driven means affixed to one of said spools when said cartridge is inserted in said receptacle.

2. A mobile magnetic reproducing and recording device comprising, a cartridge and a receptacle for said cartridge, said cartridge containing first and second superimposed coaxial and independently rotatable spools for the reception of a magnetic medium, a recording and reproducing head positioned in said receptacle, a pair of rollers positioned in said cartridge for guiding said magnetic medium from said first spool past the recording and reproducing head and upon said second spool, a rotatable capstan positioned in said receptacle engaging one of said rollers and said magnetic medium for moving said magnetic medium from said first spool past said reproducing and recording head, driven means affixed to said second spool, driving means positioned in said receptacle, said driving means comprising a rotatable shaft, a driver positioned over one end of said shaft, said driver being capable of axial motion with respect to said shaft but incapable of angular motion with respect thereto, a spring positioned between said shaft and said driver for positioning said driver axially on said shaft in frictional driving relationship with the driven means affixed to said second spool so that the magnetic medium may be taken up on said second spool.

3. A mobile magnetic reproducing and recording device comprising a cartridge and a receptacle for said cartridge, said cartridge containing first and second superimposed coaxial and independently rotatable spools for the reception of a magnetic medium, a recording and reproducing head positioned in said receptacle, a pair of rollers positioned in said cartridge for guiding the magnetic medium from said first spool past the recording and reproducing head and upon said second spool, a rotatable capstan positioned in said receptacle engaging one of said rollers and said magnetic medium for moving said magnetic medium from said first spool past said reproducing and recording head, driven means affixed to said second spool, driving means positioned in said receptacle, said driving means comprising, a rotatable shaft, a driver positioned over one end of said shaft, said driver being capable of axial motion with respect to said shaft but incapable of angular motion with respect thereto, a spring positioned between said shaft and said driver for positioning said driver axially on said shaft in frictional driving relationship with the driven means affixed to said second spool so that the magnetic medium may be taken up on said second spool, and means positioned upon said cartridge for automatically initiating operation of said mobile magnetic reproducing and recording device when said cartridge is inserted in said receptacle.

4. A mobile magnetic reproducing and recording device comprising a cartridge and a receptacle for said cartridge, said cartridge containing first and second superimposed coaxial and independently rotatable spools for the reception of a magnetic medium, a recording and reproducing head positioned in said receptacle, guide means including a roller positioned in said cartridge for guiding said magnetic medium from said first spool past the recording and reproducing head and upon said second spool, a rotatable capstan positioned in said receptacle engaging said roller and said magnetic medium for moving said magnetic medium from said first spool past said reproducing and recording head, driven means affixed to said second spool, and driving means positioned in said receptacle frictionally engaging said driven means for rotating said second spool and taking up the magnetic medium on said second spool.

5. A mobile magnetic reproducing and recording device comprising a cartridge and a receptacle for said cartridge, said cartridge containing first and second superimposed and independently rotatable spools for the reception of a magnetic medium and guide means for guiding said magnetic medium past a reproducing and recording head, a first driving means positioned in said receptacle and engaging said magnetic medium and a portion of said guide means for moving said magnetic medium from said first spool past the reproducing and recording head, driven means affixed to said second spool, and a second driving means positioned in the receptacle and frictionally engaging said driven means for taking up the magnetic medium on the said second spool.

References Cited in the file of this patent

UNITED STATES PATENTS

| | | |
|---|---|---|
| 2,349,018 | Tasker | May 16, 1944 |
| 2,364,556 | Somers | Dec. 5, 1944 |
| 2,568,601 | Anderson | Sept. 18, 1951 |
| 2,632,059 | Camras | Mar. 17, 1953 |
| 2,655,563 | Conmell | Oct. 13, 1953 |
| 2,668,021 | Gleason | Feb. 2, 1954 |
| 2,706,683 | Bruderlin | Apr. 19, 1955 |
| 2,713,618 | McNabb | July 19, 1955 |
| 2,732,144 | Jones | Jan. 24, 1956 |